United States Patent
Soman et al.

(10) Patent No.: US 10,638,532 B2
(45) Date of Patent: Apr. 28, 2020

(54) METHOD AND CIRCUITRY FOR WIRELESS COMMUNICATIONS BETWEEN DIFFERENT NETWORKS

(71) Applicant: Texas Instruments Incorporated, Dallas, TX (US)

(72) Inventors: Mehul Soman, Dallas, TX (US); Arvind Kandhalu Raghu, Plano, TX (US); Kumaran Vijayasankar, Allen, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 230 days.

(21) Appl. No.: 15/271,046

(22) Filed: Sep. 20, 2016

(65) Prior Publication Data
US 2018/0084531 A1    Mar. 22, 2018

(51) Int. Cl.
    *H04W 72/04*     (2009.01)
    *H04W 76/16*     (2018.01)
    *H04L 12/46*     (2006.01)
    *H04L 29/06*     (2006.01)

(52) U.S. Cl.
    CPC ......... *H04W 76/16* (2018.02); *H04L 12/4633* (2013.01); *H04L 69/18* (2013.01)

(58) Field of Classification Search
    None
    See application file for complete search history.

(56) References Cited

U.S. PATENT DOCUMENTS

| | | | |
|---|---|---|---|
| 2008/0080533 A1* | 4/2008 | Yamane | H04L 12/4641 370/401 |
| 2011/0090880 A1* | 4/2011 | Abraham | H04W 12/08 370/338 |
| 2012/0079065 A1* | 3/2012 | Miyamoto | H04L 12/287 709/217 |
| 2013/0242741 A1* | 9/2013 | Ozawa | H04M 3/367 370/235 |
| 2013/0322255 A1* | 12/2013 | Dillon | H04L 47/22 370/236 |
| 2015/0188823 A1* | 7/2015 | Williams | H04L 47/125 370/235 |
| 2016/0029384 A1* | 1/2016 | Sidhu | H04W 72/0453 370/329 |
| 2017/0126533 A1* | 5/2017 | Waheed | H04L 43/0894 |
| 2017/0171888 A1* | 6/2017 | Itagaki | H04W 74/0816 |
| 2017/0347377 A1* | 11/2017 | Herzen | H04W 74/0825 |
| 2018/0035352 A1* | 2/2018 | Purohit | H04W 40/02 |

* cited by examiner

*Primary Examiner* — Brandon M Renner
(74) *Attorney, Agent, or Firm* — Ebby Abraham; Charles A. Brill; Frank D. Cimino

(57) ABSTRACT

Methods and circuitry for transmitting data between a first network operating in a first frequency band and a second network operating in a second frequency are disclosed. An example of a method includes receiving a first data frame transmitted in the first network in the first frequency band. A transmitter is switched to transmit in the second frequency band, A second data frame is transmitted in the second frequency band, wherein the second data frame includes a payload section, and wherein at least a portion of the first data frame is in the payload section of the second data frame.

20 Claims, 2 Drawing Sheets

METHOD AND CIRCUITRY FOR WIRELESS COMMUNICATIONS BETWEEN DIFFERENT NETWORKS

BACKGROUND

Wireless networks and the devices operating on wireless networks are constantly evolving, providing for faster and more accurate data transmission. Different hardware configurations may use different transmission frequencies, so they are not compatible with older devices and do not function on older networks. This leaves a problem with a first group of devices compatible solely with a first network and a second group of devices compatible solely with a second network.

Some devices have the ability to transmit on two or more frequency bands like sub 1 GHz and 2.4 GHz, so as to operate on different networks. However, these devices are rendered useless when technology evolves to create a new protocol on frequency bands that the older devices do not recognize. Accordingly, these older devices are rendered useless on the new protocols.

SUMMARY

Methods and circuitry for transmitting data between a first network operating in a first frequency band and a second network operating in a second frequency band are disclosed. An example of a method includes receiving a first data frame transmitted in the first network in the first frequency band. A transmitter is switched to transmit in the second frequency band. A second data frame is transmitted in the second frequency band, wherein the second data frame includes a payload section, and wherein at least a portion of the first data frame is in the payload section of the second data frame.

DETAILED DESCRIPTION

Figure 1:
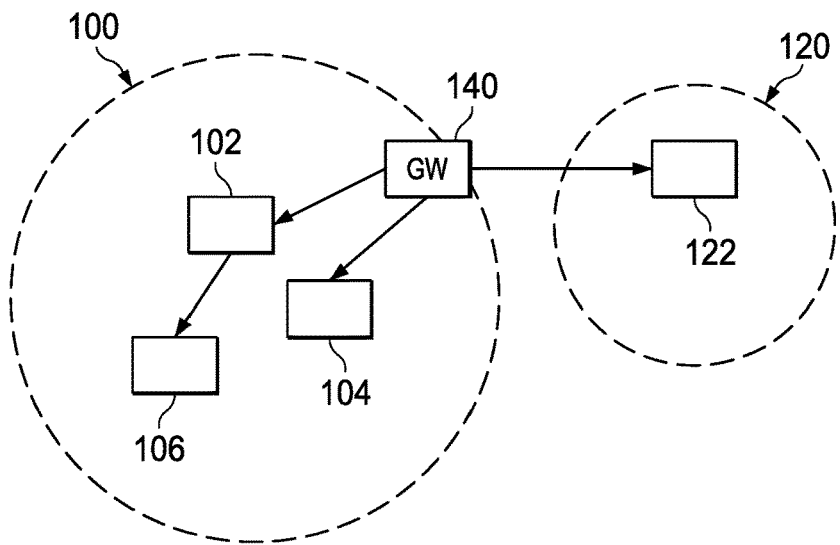
FIG. 1 is a block diagram of two exemplary networks operating on two different frequencies.

Example embodiments are described with reference to the drawings, wherein like reference numerals are used to designate similar or equivalent elements. Illustrated ordering of acts or events should not be considered as limiting, as some acts or events may occur in different order and/or concurrently with other acts or events. Furthermore, some illustrated acts or events may not be required to implement a methodology in accordance with this disclosure.

FIG. 1 is a block diagram of two exemplary networks operating on two different frequency bands. A first network 100 operates on a first frequency band using a first protocol. Examples of the first network 100 include various versions of the IEEE 802.15.4 formats. The first network 100 may have several devices, such as televisions, thermostats, and other devices that receive and/or transmit data wirelessly on the first frequency band using the first protocol. In the example of FIG. 1, the first network 100 has three devices, a first device 102, a second device 104, and a third device 106, all transmitting in the first frequency band. A second network 120 operates on the same or different frequency band using a second protocol that may or may not be the same as the first protocol. An example of the second network is a Bluetooth low energy (BLE) network or a smart network. In the example of FIG. 1, the second network 120 has a single device 122 that operates in the second frequency band.

Figure 2:
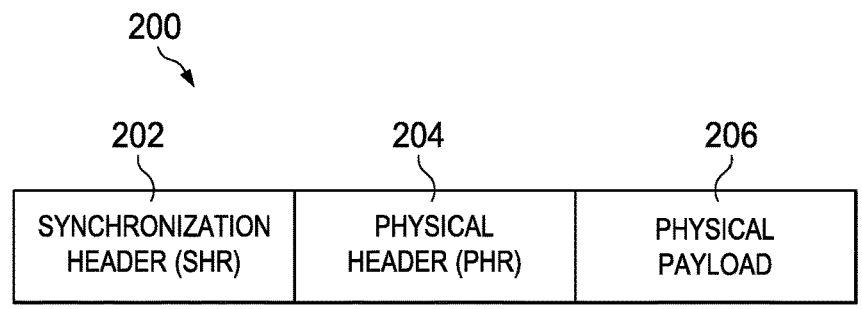
FIG. 2 is a diagram illustrating an example of the data transmission protocol used in the networks of FIG. 1.

FIG. 2 is a chart showing an example of the data transmission protocol using a data frame 200 generated by one or more of the devices within the networks 100 and 120 of FIG. 1. The data frame 200 is sometimes referred to as a physical layer frame. In some examples, the first and second networks 100 and 120 use similar protocols for transmitting data, which is shown by the data frame 200 in FIG. 2, but they may transmit in different frequency bands. Other example networks may use different data transmission protocols. The data frame 200 includes a synchronization header 202, which is sometimes referred to as the SHR 202. A physical layer header 204 follows the synchronization header 202. The physical layer header 204 is sometimes referred to as the PHY 204. A physical layer payload 206 follows the PHY 204 and contains data that is transmitted by the data frame 200. All the information contained in the data frame 200 is transmitted on the frequency band assigned to its network. After a device transmits a data frame, it listens for a response of some sort to indicate that the network is active. If no response is received after a predetermined period or a predetermined number of transmissions, the device enters a mode where it performs as though the network is inactive. For example, the device may stop transmitting or listening for transmissions.

The SHR 202 identifies the start of the frame 200 as is known in the art. For example, the SHR 202 may include a predetermined data sequence that identifies the start of the data frame 200. Other devices in the first network 100 identify the sequence in the SHR 202 as the start of the data frame 200 and perform accordingly. For example, the other devices may turn off their transmitters and listen for the remaining portions of the data frame 200. The SHR 202 may further contain a preamble sequence that enables a receiving device to acquire and synchronize to the incoming signal and a start of frame delimiter that signals the end of the preamble. For example, if the first device 102 is transmitting the SHR 202, the second device 104 may synchronize on the SHR 202 to receive the remainder of the frame 200. In some examples, the PHR 204 uses Carrier Sense Multiple Access (CSMA) with Collision Avoidance (CA) to access a channel. Accordingly, a device in a network with data to transmit will first listen to the radio channel and, if the channel is clear, then the device will transmit its data frame. The PHY header (PHR) 204 may include information such as the data frame length, which indicates the length of the data frame 200.

The network 100 of FIG. 1 has a gateway 140 connected thereto. The gateway 140 enables communications between devices in the two networks 100 and 120 operating in different frequency bands and, in some examples, using different protocols. The gateway 140 may be implemented in hardware, software, and/or firmware as will be understood by those skilled in the art.

Figure 3:
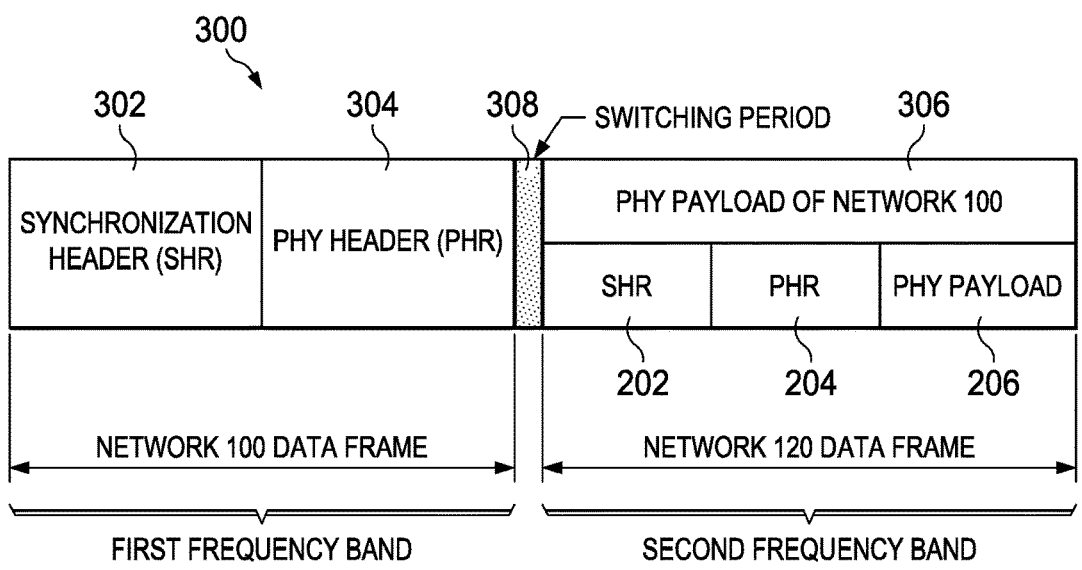
FIG. 3 is a diagram illustrating an example of the gateway of FIG. 1 converting a data frame transmitted on the first network of FIG. 1 to a format readable on the second network of FIG. 1.

FIG. 3 is a diagram illustrating an example of a data frame 300 generated by the gateway 140. The data frame 300 was received from a device on the first network 100 and converted to a format and frequency band that is readable by devices on the second network 120 by the gateway 140. In summary, the gateway 140 generates an SHR, a PHR, and a payload readable in the second network 120 that are transmitted by way of the payload of the data frame 300. In the more detailed description provided below, the first device 102 in the first network 100 transmits data by way of a data frame to the device 122 in the second network 120. The gateway 140 receives the data frame from the first device 102, which is substantially similar to the data frame 200 of FIG. 2 and is used herein as a reference data frame. The gateway 140 deciphers information in the data frame 200 to determine that the payload 206 is to be transmitted to the device 122 in the second network 120 FIG. 1. The data frame 300 is generated wherein the payload 306 of the data frame 300 includes or encapsulates the data frame 200 transmitted by the first device 102.

In some examples, the gateway 140 transmits an SHR 302 and a PHR 304 back on the first network 100, which causes the first device 102 to remain active. More specifically, the first device 102 listens for a return after it transmits the data frame 200, so when the gateway 140 transmits the SHR 302 and the PHR 304 in the first frequency band, the first device 102 continues to function as though the first network 100 is active. Instead of transmitting the payload 306 in the first frequency band, the gateway 140 switches to the second frequency band prior to transmitting the payload 306 of the data frame 300. In the example of FIG. 3, the gateway 140 takes a period 308 to change the transmission frequency to the second frequency band. In some examples, the switching period 308 between the first frequency band and the second frequency band is approximately 300 us, which is significantly less than the time of the frame 200. The payload 306 of the data frame 300 is then transmitted in the second frequency band and can be received by the device 122 in the second network 120. In some examples, the period 308 is approximately 300 µs and the total width of the data frame 300 is approximately 300 ms, so the period 308 is insignificant. The maximum data frame size for data frames converted from data frames on the first network 100 to data frames on the second network 120 are limited by the payload size of the data frame 200. This limitation typically will not have any negative effects because the payload sizes are usually very small.

As shown in FIG. 3, the payload 306 includes the SHR 202, the PHR 204, and the payload 206, which is the data frame 200. Accordingly, the payload 306 includes the data frame 200 that is to be transmitted to the device 122 in the second network 120. In the example of FIG. 3, the SHR 202, the PHR 204, and the payload 206 are duplicated or encapsulated in the payload 306 so as to be retransmitted in the second frequency band. The device 122 reads the SHR 202, the PHR 204 and the payload 206 as a transmission of a data frame transmitted on the second network 120 and processes the data frame accordingly. The devices in the first network 100 receive the SHR 202 and the PHR 204, so they will not try to transmit any data frame during that time because they are busy decoding the complete payload, which may be decoded as corrupt data. In other examples, the PHR 204 transmitted in the first network 100 indicates the length of the data frame 200, so the devices in the first network 100 are waiting for the payload 206, which is transmitted in the second frequency band, and they do not transmit during this period. Additionally, the devices in the first network 100 are not aware of any communication generated by the gateway 140 to the second network 120. The system described above is reversible, so the device 122 in the second network 120 may transmit a data frame to the first device 102 in the first network 100 by the same methods described above.

Figure 4:
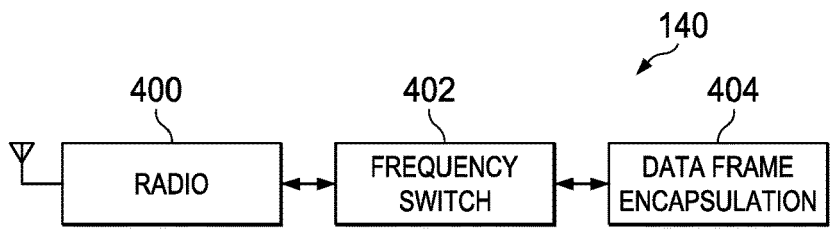
FIG. 4 is a block diagram of an exemplary gateway of FIG. 1.

FIG. 4 is a block diagram of an example of the gateway 140 of FIG. 1. The gateway 140 includes a radio 400 that is capable of transmitting and receiving data frames transmitted in the first and second frequency bands. A frequency switch 402 sets the frequency band that the radio 400 receives or transmits data frames. A data frame encapsulation device 404 encapsulates the data frame 200 into the payload of the data frame 300 as described above.

The gateway 140 of FIG. 1 is described as being a separate, standalone device wirelessly connected to the first network 100 and the second network 120. In other examples, the devices in the first and second networks 100 and 120 each have a gateway 140 coupled to the devices. When a device transmits a data frame intended for another network, the gateway performs the functions described with reference to the gateway 140. It is noted that the system has been described above as having or operating in two networks. In other examples, the system may have a plurality of networks all operating in different frequency bands and/or different transmission protocols. The gateway 140 selects the operating frequency band and/or transmission protocol from the plurality of different frequencies and/or transmission protocols and processes the data frames as described above.

Figure 5:
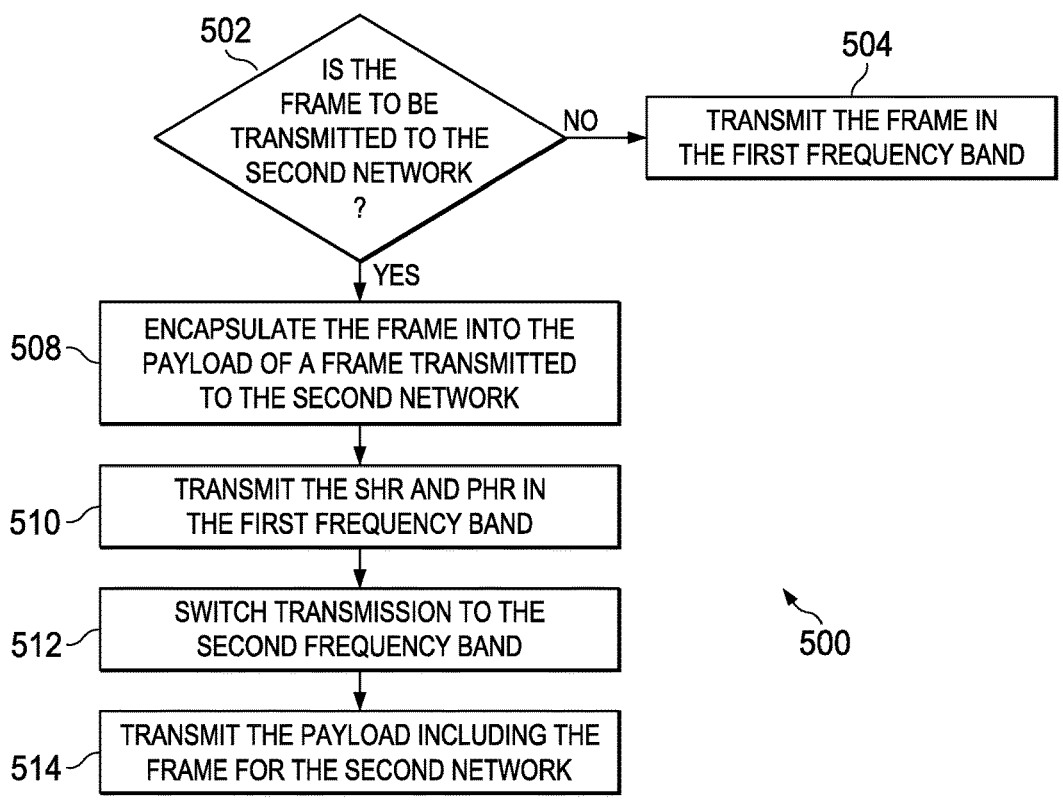
FIG. 5 is a flowchart describing the function of the gateway of FIG. 1.

FIG. 5 is a flowchart 500 describing the function of the gateway of FIG. 1. The flowchart 500 commences with decision block 502 where an inquiry is made as to whether a data frame received by the gateway 140 is to be transmitted to the second network 120. If the result of the inquiry in decision block 502 is negative, processing proceeds to block 504, where the data frame is transmitted in the first frequency band. More specifically, the data frame was generated and transmitted by a device in the first network 100 and is intended for a device in the first network 100, so the functions of the gateway 140 described above do not interfere with the transmission.

If the response from decision block 502 is affirmative, processing proceeds to block 508 where the data frame 200 transmitted on the first network 100 is encapsulated into the payload 306 of a data frame that is to be transmitted to the second network 120. Processing proceeds to block 510 where the SHR 302 and the PHR 304 of the data frame 300 are transmitted on the first network 100 using the first frequency band. The device that transmitted the frame 200 will receive the SHR 302 and PHR 304 and know that the first network 100 is active. Processing proceeds to block 512 where the gateway 140 switches its transmission frequency band to the second frequency band used by the second network 120. Processing proceeds to block 514 where the gateway 140 transmits the payload 306, which includes the data frame 200, in the second frequency band. Only devices on the second network 120 receive the payload 306, which they decipher as a full data frame. The devices on the second network 120 process the data frame 200 as per their protocol.

Another example of the gateway 140 transmits data frames from the first network 100 to the second network 120 during idle periods. These idle periods may include periods when the gateway 140 can go into low power modes because it is not expecting to transmit or receive any data frames on either the first network 100 or the second network 120. In some examples, the gateway 140 transmits the data frames during carrier sense multiple access/collision avoidance (CSMA/CA) back-off slots or idle slots in the networks 100 and 120. For example, the gateway 140 may chose a back-off slot to switch to the second frequency band and transmit the data frame during the back-off slot. The data frame may or may not be encapsulated into a payload of a second data frame as described above. In some embodiments, a power management system detects that the gateway 140 is idle and initiates transmissions during these periods.

Figure 6:
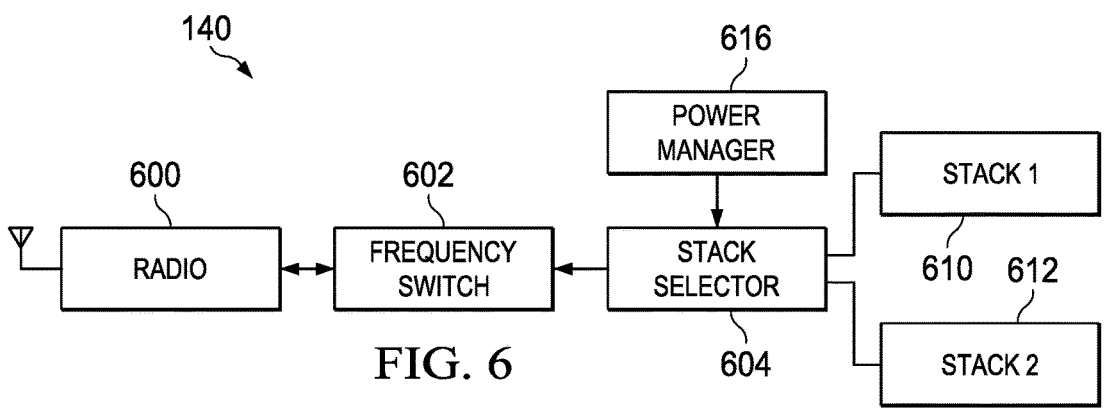
FIG. 6 is a block diagram of an example of the gateway of FIG. 1 that transmits during idle periods.

FIG. 6 is a block diagram of an example of the gateway 140 of FIG. 1 that transmits during idle periods. The gateway 140 includes a radio 600 that transmits and receives in the first and second frequency bands. The frequency band in which the radio 600 operates is selected by a frequency switch 602. A stack selector 604 is shown as coupled to the frequency switch 602, but in other examples, it may be coupled to the radio 600. The stack selector 604 selects either a first stack 610 or a second stack 612 for coupling to the radio 600. The first stack 610 may contain data frames for transmission on the first network 100 and the second stack 612 may contain data frames for transmission on the second network 120. The first data stack 610 and the second data stack 612 may contain data frames received from their respective networks. A power manager 616 is coupled to the stack selector 604 and enables data frames to be sent to the radio 600 or the stacks 610 and 612 during low power modes, indicating that the networks 100 and 120 are idle.

The gateway 140 monitors the networks 100 and 120 for the above-described idle times or times. Such idle times may occur when the gateway 140 draws little power, indicated by a signal from the power manager 616. During these times, the gateway 140 may transmit data frames from the first stack 610 or the second stack 612 in the first frequency band to the first network 100 or in the second frequency band to the second network 120.

The gateway 140 and methods have been described as operating by a single transmitter that switches frequency bands. In other examples, the gateway 140 may have several transmitters operating in different frequency bands wherein a selection is made as two which transmitter is activated rather than switching the frequency band of a single transmitter.

Although illustrative embodiments have been shown and described by way of example, a wide range of alternative embodiments is possible within the scope of the foregoing disclosure.

What is claimed is:

1. A method comprising:
   in response to obtaining a first data frame in a first frequency band from a network, generating a second data frame based on a second transmission protocol, the first data frame having a first data format based on a first transmission protocol, the generating including:
      converting at least a portion of the first data frame into a payload having a second data format, the second data format based on the second transmission protocol, the second transmission protocol different from the first transmission protocol; and
      encapsulating the payload into the second data frame;
   after invoking the encapsulation of the payload into the second data frame, transmitting a third data frame in the first frequency band to maintain the network active, the third data frame based on the first transmission protocol;
   switching a transmitter to transmit the second data frame in a second frequency band; and
   transmitting the second data frame in the second frequency band.

2. The method of claim 1, wherein the first data frame includes a synchronization header and a physical layer header.

3. The method of claim 1, wherein the third data frame includes a synchronization header and a physical layer header.

4. The method of claim 1, wherein the payload is a second payload, the first data frame includes a first payload, the second payload includes the first payload, and the third data frame does not include the first payload.

5. The method of claim 1, wherein the first data frame includes a synchronization header and at least one of the second data frame or the third data frame includes the synchronization header.

6. The method of claim 1, wherein the first data frame includes a physical layer header and at least one of the second data frame or the third data frame includes the physical layer header.

7. The method of claim 1, wherein switching the transmitter is after invoking the encapsulation of the payload into the second data frame, transmitting the second data frame in the second frequency band includes transmitting the payload of the second data frame in the second frequency band, and further including transmitting at least one other portion of the second data frame in the first frequency band.

8. The method of claim 1, wherein at least one of the first data frame, the second data frame, or the third data frame are transmitted during a carrier sense multiple access/collision avoidance back-off slot.

9. The method of claim 1, wherein the first transmission protocol is Bluetooth low energy and the second transmission protocol is based on IEEE 802.15.4.

10. A method comprising:
    converting at least a portion of a first data frame into a payload, the first data frame obtained in a first frequency band of a network, the first data frame having a first data format based on a first transmission protocol, the payload having a second data format based on a second transmission protocol different from the first transmission protocol;
    encapsulating the payload into a second data frame;
    after invoking the encapsulation of the payload into the second data frame, transmitting a third data frame in the first frequency band to maintain the network active, the third data frame based on the first transmission protocol;
    switching a transmitter to transmit the second data frame in a second frequency band; and
    transmitting the second data frame in the second frequency band.

11. The method of claim 10, wherein the the first data frame includes a synchronization header and at least one of the second data frame or the third data frame includes the synchronization header.

12. The method of claim 10, wherein the the first data frame includes a physical layer header and at least one of the second data frame or the third data frame includes the physical layer header.

13. The method of claim 10, wherein switching the transmitter is after invoking the encapsulation of the payload into the second data frame, transmitting the second data frame in the second frequency band includes transmitting the payload of the second data frame in the second frequency band, and further including transmitting at least one other portion of the second data frame in the first frequency band.

14. The method of claim 10, wherein at least one of the first data frame, the second data frame, or the third data frame are transmitted during a carrier sense multiple access/collision avoidance back-off slot.

15. A method comprising:
in response to obtaining a first data frame in a first frequency band transmitted in a first network intended for a device in a second network, converting at least a portion of the first data frame into a payload of a second data frame, the first data frame having a first data format based on a first transmission protocol, the payload having a second data format based on a second transmission protocol different from the first transmission protocol;
after invoking an encapsulation of the payload into the second data frame, transmitting a third data frame in the first frequency band to maintain the first network active, the third data frame based on the first transmission protocol;
switching a transmitter to transmit the second data frame in a second frequency band; and
transmitting the second data frame in the second network in the second frequency band.

16. The method of claim 15, further including monitoring power consumption associated with the transmitter, wherein low power consumption is indicative of one of an idle state or a carrier sense multiple access/collision avoidance (CSMA/CA) back off state, at least one of the idle state or the CSMA/CA back off state associated with the transmitter.

17. The method of claim 15, wherein the first data frame includes a synchronization header and at least one of the second data frame or the third data frame includes the synchronization header.

18. The method of claim 15, wherein the first data frame includes a physical layer header and at least one of the second data frame or the third data frame includes the physical layer header.

19. The method of claim 15, wherein at least one of the first data frame, the second data frame, or the third data frame are transmitted during a carrier sense multiple access/collision avoidance back-off slot.

20. A gateway comprising:
a receiver to receive a first data frame in a first frequency band of a network, the first data frame having a first data format based on a first transmission protocol;
a data frame encapsulation device to:
convert at least a portion of the first data frame into a payload having a second data format, the second data format based on a second transmission protocol different from the first transmission protocol; and
encapsulate the payload into at least a portion of a second data frame; and
a transmitter to:
after invoking the encapsulation of the payload into at least the portion of the second data frame, transmit a third data frame in the first frequency band to maintain the network active, the third data frame based on the first transmission protocol;
switch from the first frequency band to a second frequency band; and
transmit the second data frame in the second frequency band.

* * * * *